US012404935B2

United States Patent
Suzuki (10) Patent No.: US 12,404,935 B2
(45) Date of Patent: Sep. 2, 2025

(54) SLIDING COMPONENT (71) Applicant: EAGLE INDUSTRY CO., LTD., Tokyo (JP)

(72) Inventor: Hiroshi Suzuki, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 121 days.

(21) Appl. No.: 18/013,520

(22) PCT Filed: Jul. 1, 2021

(86) PCT No.: PCT/JP2021/024944
§ 371 (c)(1),
(2) Date: Dec. 28, 2022

(87) PCT Pub. No.: WO2022/009770
PCT Pub. Date: Jan. 13, 2022

(65) Prior Publication Data
US 2023/0296131 A1 Sep. 21, 2023

(30) Foreign Application Priority Data
Jul. 6, 2020 (JP) .................... 2020-116359

(51) Int. Cl.
*F16J 15/34* (2006.01)
(52) U.S. Cl.
CPC ................ *F16J 15/3416* (2013.01)
(58) Field of Classification Search
CPC .. F16J 15/3416; F16C 33/1065; F16C 17/045
See application file for complete search history.

(56) References Cited

U.S. PATENT DOCUMENTS

| 1,876,515 A | * | 9/1932 | Emmet | F16J 15/3416 |
| | | | | 277/408 |
| 2,244,450 A | * | 6/1941 | Erni | F16J 15/3416 |
| | | | | 415/113 |
| 3,380,040 A | | 4/1968 | Liggett | F16C 17/045 |
| 3,383,116 A | | 5/1968 | Carter | 277/96 |
| 3,443,813 A | * | 5/1969 | Valdemar | F16J 15/3416 |
| | | | | 277/408 |

(Continued)

FOREIGN PATENT DOCUMENTS

| CN | 1245552 | 2/2000 | ............ F16J 15/34 |
| CN | 2460801 | 11/2001 | ............ F16J 15/40 |

(Continued)

OTHER PUBLICATIONS

International Search Report and Written Opinion issued in PCT/JP2021/024940, dated Aug. 10, 2021, with English translation, 13 pages.

(Continued)

*Primary Examiner* — Eugene G Byrd
(74) *Attorney, Agent, or Firm* — HAYES SOLOWAY P.C.

(57) ABSTRACT

Provided is a sliding component capable of stably reducing the frictional resistance between sliding surfaces entailing eccentric rotation. A sliding component has a sliding surface relatively sliding with eccentric rotation. The sliding surface is provided with a dynamic pressure generation groove defined by side walls extending in a circumferential direction. At least one of the side walls is formed in a waveshape with amplitude in a radial direction.

11 Claims, 7 Drawing Sheets

(56) References Cited

U.S. PATENT DOCUMENTS

| | | | |
|---|---|---|---|
| 3,527,465 A | 9/1970 | Guinard | |
| 3,675,935 A | 7/1972 | Ludwig | F16J 15/342 |
| 3,695,789 A | 10/1972 | Jansson | F01C 21/003 |
| 3,704,019 A | 11/1972 | McHugh | 277/400 |
| 3,782,737 A | 1/1974 | Ludwig et al. | 277/27 |
| 4,056,478 A | 11/1977 | Capelli | C01M 5/00 |
| 4,071,253 A | 1/1978 | Heinen et al. | 277/3 |
| 4,523,764 A | 6/1985 | Albers et al. | 277/3 |
| 4,772,188 A | 9/1988 | Kimura et al. | F04C 18/04 |
| 4,874,302 A | 10/1989 | Kobayashi et al. | F04C 18/04 |
| 4,889,348 A | 12/1989 | Amundson | 277/306 |
| 5,071,141 A | 12/1991 | Lai et al. | |
| 5,092,612 A | 3/1992 | Victor et al. | 277/96.1 |
| 5,174,584 A | 12/1992 | Labrman | 277/400 |
| 5,180,173 A | 1/1993 | Kimura et al. | |
| 5,224,714 A | 7/1993 | Kimura | 277/400 |
| 5,316,455 A | 5/1994 | Yoshimura | F04C 29/0021 |
| 5,447,316 A | 9/1995 | Matsui | 277/400 |
| 5,556,111 A * | 9/1996 | Sedy | F16C 33/741 |
| | | | 277/400 |
| 5,558,341 A | 9/1996 | McNickle | 277/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A | 11/2000 | Wang | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 | 7/2010 | Roberts-Haritonov | 277/401 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,666 B2 | 2/2017 | Ferris | F16J 15/3412 |
| 9,574,667 B2 | 2/2017 | Takahashi et al. | F16J 15/342 |
| 9,587,745 B2 * | 3/2017 | Itadani | F16J 15/348 |
| 9,772,037 B2 | 9/2017 | Itadani et al. | F16J 15/3412 |
| 9,784,372 B2 | 10/2017 | Iguchi | F16J 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/164 |
| 10,337,620 B2 | 7/2019 | Tokunaga et al. | F16J 15/342 |
| 10,443,737 B2 | 10/2019 | Itadani | F16J 15/342 |
| 10,495,228 B2 | 12/2019 | Itadani | F16J 15/3412 |
| 10,865,883 B2 | 12/2020 | Seki et al. | F16J 15/3404 |
| 11,053,975 B2 * | 7/2021 | Imura | F16C 17/045 |
| 11,221,071 B2 | 1/2022 | Sasaki et al. | F16J 15/34 |
| 11,248,706 B2 | 2/2022 | Imura | F16C 33/74 |
| 11,320,052 B2 | 5/2022 | Imura et al. | F16J 15/34 |
| 11,815,184 B2 | 11/2023 | Inoue et al. | F16J 15/34 |
| 11,821,521 B2 | 11/2023 | Imura et al. | F16J 15/34 |
| 11,913,454 B2 | 2/2024 | Suzuki | F04C 29/00 |
| 2002/0014743 A1 | 2/2002 | Zheng | 277/358 |
| 2002/0093141 A1 | 7/2002 | Wang | F16J 15/34 |
| 2002/0158416 A1 | 10/2002 | Hosanna | F16J 15/3404 |
| 2003/0041680 A1 | 3/2003 | Saito et al. | F02N 15/06 |
| 2004/0080112 A1 | 4/2004 | Tejima | F16J 15/3436 |
| 2005/0135957 A1 | 6/2005 | Park | F04C 18/0215 |
| 2005/0212217 A1 | 9/2005 | Tejima | 277/399 |
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0050260 A1 | 2/2008 | Iwanami et al. | 418/55.6 |
| 2008/0100001 A1 | 5/2008 | Flaherty | |
| 2009/0200749 A1 | 8/2009 | Teshima | F16J 15/3484 |
| 2011/0194966 A1 | 8/2011 | Takeuchi | F04B 18/0215 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrufer | C10M 103/02 |
| 2013/0209011 A1 | 8/2013 | Tokunaga | |
| 2013/0323105 A1 | 12/2013 | Chao et al. | F04C 29/028 |
| 2014/0159314 A1 * | 6/2014 | Hosoe | F16J 15/3496 |
| | | | 277/358 |
| 2014/0197600 A1 | 7/2014 | Hosoe | F16J 15/342 |
| 2014/0217676 A1 | 8/2014 | Hosoe et al. | 277/350 |
| 2014/0294330 A1 | 10/2014 | Tokunaga | F16C 17/04 |
| 2014/0319776 A1 | 10/2014 | Theike et al. | |
| 2015/0036955 A1 | 2/2015 | Nomura et al. | F16C 33/20 |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0184752 A1 | 7/2015 | Itadani | F16J 15/3412 |
| 2015/0345642 A1 | 12/2015 | Haas | F16J 15/3496 |
| 2015/0377297 A1 | 12/2015 | Tokunaga et al. | F16C 33/748 |
| 2015/0377360 A1 * | 12/2015 | Itadani | F16J 15/3448 |
| | | | 277/400 |
| 2016/0033045 A1 | 2/2016 | Itadani et al. | F16J 15/3412 |
| 2016/0097457 A1 | 4/2016 | Sun et al. | F16J 15/3412 |
| 2017/0089467 A1 | 3/2017 | Young | F01D 11/003 |
| 2017/0146014 A1 | 5/2017 | Ohta et al. | F04C 29/0021 |
| 2017/0241549 A1 * | 8/2017 | Itadani | F16J 15/40 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 | 1/2018 | Hosoe et al. | F16J 15/164 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |
| 2018/0299015 A1 | 10/2018 | Itadani | F16J 15/3448 |
| 2019/0169988 A1 | 6/2019 | Tokunaga et al. | F01C 19/12 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0141444 A1 | 5/2020 | Thatte | F16J 17/08 |
| 2020/0224722 A1 * | 7/2020 | Imura | F16C 33/743 |
| 2020/0224768 A1 | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0116032 A1 * | 4/2021 | Kimura | F16J 15/188 |
| 2021/0355992 A1 * | 11/2021 | Tokunaga | F16J 15/3412 |
| 2021/0364034 A1 | 11/2021 | Okada | F16J 15/342 |
| 2022/0056949 A1 | 2/2022 | Ikeda et al. | F16C 17/04 |
| 2022/0128151 A1 | 4/2022 | Tuk et al. | F16J 15/34 |
| 2023/0027772 A1 | 1/2023 | Suzuki et al. | F16C 17/02 |
| 2023/0258182 A1 | 8/2023 | Suzuki | F04C 18/0215 |

FOREIGN PATENT DOCUMENTS

| | | | |
|---|---|---|---|
| CN | 1401924 | 3/2003 | F16J 15/16 |
| CN | 1529063 | 9/2004 | F16C 33/10 |
| CN | 1607710 | 4/2005 | F16C 17/08 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |

(56) References Cited

FOREIGN PATENT DOCUMENTS

| | | | | |
|---|---|---|---|---|
| CN | 101861485 | 10/2010 | ............... | F16J 15/34 |
| CN | 203098871 | 7/2013 | ............... | F16J 15/34 |
| CN | 103557229 | 2/2014 | ............. | F16C 17/04 |
| CN | 103557334 | 2/2014 | ............... | F16J 15/34 |
| CN | 203641506 | 6/2014 | ............... | F16J 15/16 |
| CN | 104169622 | 11/2014 | ............... | F16J 15/34 |
| CN | 104321568 | 1/2015 | ............. | F16C 33/72 |
| CN | 104685273 | 6/2015 | ............... | F16J 15/34 |
| CN | 205244387 | 5/2016 | ............... | F16J 15/16 |
| CN | 106029294 | 10/2016 | ........... | B23K 26/364 |
| CN | 205877184 | 1/2017 | ............... | F16J 15/16 |
| CN | 205877198 | 1/2017 | ............... | F16J 15/34 |
| CN | 106439023 | 2/2017 | ............... | F16J 15/16 |
| CN | 107489770 | 12/2017 | ............... | F16J 15/34 |
| CN | 108131386 | 6/2018 | ............. | F16C 17/10 |
| CN | 109237042 | 1/2019 | ............... | F16J 15/34 |
| CN | 110770456 | 2/2020 | ............. | F16C 33/12 |
| CN | 110925426 | 3/2020 | ............... | F16J 15/16 |
| CN | 111656065 | 9/2020 | ............... | F16J 15/34 |
| DE | 3223703 | 6/1982 | ............... | F16J 15/34 |
| DE | 10048256 | 9/2000 | ............. | F16C 33/06 |
| DE | 102008038396 | 2/2010 | | |
| EP | 0369295 | 11/1988 | ............... | F16J 15/34 |
| EP | 0589514 | 9/1992 | ................ | B21J 5/12 |
| EP | 0518681 | 12/1992 | ............ | G11B 15/60 |
| EP | 0637706 | 8/1993 | ............... | F16J 15/34 |
| EP | 2138225 | 12/2009 | ............. | B01J 13/20 |
| EP | 2754931 | 7/2014 | ............... | F16J 15/34 |
| EP | 3112078 | 1/2017 | ........... | B23K 26/364 |
| EP | 3196516 | 7/2017 | ............... | F16J 15/34 |
| EP | 3217049 | 9/2017 | ............... | F16J 15/34 |
| EP | 3396186 | 10/2018 | ............. | F16C 33/10 |
| EP | 3575621 | 12/2019 | ............. | F16C 33/10 |
| EP | 3575643 | 12/2019 | ............... | F16J 15/34 |
| EP | 3650722 | 5/2020 | ............. | F16C 33/12 |
| FR | 2342440 | 9/1997 | ............... | F16J 15/34 |
| GB | 1509482 | 5/1978 | ............. | F16C 33/10 |
| GB | 2263952 | 8/1993 | ............... | F16J 15/34 |
| JP | S51-034974 | 3/1976 | | |
| JP | S52-143571 | 10/1977 | ............... | F16J 15/26 |
| JP | 57163770 | 10/1982 | ............ | F16J 15/3412 |
| JP | S59-195253 | 12/1984 | ............... | F16J 15/34 |
| JP | S59-195254 | 12/1984 | ............... | F16J 15/34 |
| JP | S61-8402 | 1/1986 | ................ | F01C 1/01 |
| JP | S63-134883 | 6/1988 | ............. | F04C 18/02 |
| JP | S63-190975 | 8/1988 | ............... | F16J 15/34 |
| JP | H02-16381 | 1/1990 | ............. | F04C 18/02 |
| JP | H02-236067 | 9/1990 | ............... | F16J 15/34 |
| JP | H02-136863 | 11/1990 | ............... | F16J 15/34 |
| JP | H04-50559 | 2/1992 | ............... | F16J 15/34 |
| JP | H04-337165 | 11/1992 | ............... | F16J 15/34 |
| JP | H04-362289 | 12/1992 | ............. | F04C 18/02 |
| JP | H05-60247 | 3/1993 | ............... | F16J 15/34 |
| JP | H05-296248 | 11/1993 | | |
| JP | H05-90049 | 12/1993 | ............... | F16J 15/34 |
| JP | H06-17941 | 1/1994 | ............... | F16J 15/34 |
| JP | H06-117547 | 4/1994 | ............... | F16J 15/34 |
| JP | H06-174107 | 6/1994 | ............... | F16J 15/34 |
| JP | H6200927 | 7/1994 | ............. | F16C 17/02 |
| JP | H06-323442 | 11/1994 | ............... | F16J 15/34 |
| JP | H06-105105 | 12/1994 | ............... | F16J 15/34 |
| JP | H07-43038 | 5/1995 | ............... | F16J 15/34 |
| JP | 9-89119 | 3/1997 | ............... | F16J 15/34 |
| JP | H09228968 | 9/1997 | ............. | F01C 17/06 |
| JP | 9-292034 | 11/1997 | ............... | F16J 15/34 |
| JP | H10-281299 | 10/1998 | ............... | F16J 15/34 |
| JP | H10-292867 | 11/1998 | | |
| JP | H10-339286 | 12/1998 | ............. | F04C 18/02 |
| JP | H11-132163 | 5/1999 | ............. | F04C 18/02 |
| JP | H11-287329 | 10/1999 | ............... | F16J 15/34 |
| JP | H11-303858 | 11/1999 | ............. | F16C 17/10 |
| JP | 3066367 | 5/2000 | ............... | F16J 15/34 |
| JP | 2001-12458 | 1/2001 | ............. | F16C 17/10 |
| JP | 2003-343730 | 12/2003 | ............... | F16J 15/22 |
| JP | 2004-360903 | 12/2004 | ............... | F16J 15/447 |
| JP | 2004360903 A | * 12/2004 | ........... | F04D 29/106 |
| JP | 2005-155894 | 6/2005 | ............... | F16J 17/04 |
| JP | 2005-180652 | 7/2005 | ............... | F16J 15/34 |
| JP | 2005-315391 | 11/2005 | | |
| JP | 2005-337503 | 12/2005 | ............... | F16J 15/34 |
| JP | 2006-9614 | 1/2006 | ............. | F04C 18/08 |
| JP | 2006-77899 | 3/2006 | ............... | F16J 15/34 |
| JP | 2006-90524 | 4/2006 | ............. | F16C 17/02 |
| JP | 2006-183702 | 7/2006 | ............. | F16C 17/04 |
| JP | 2006-316677 | 11/2006 | ............. | F04C 18/02 |
| JP | 2007-162045 | 6/2007 | | |
| JP | 2008-51018 | 3/2008 | ............. | F04C 18/02 |
| JP | 2008-51030 | 3/2008 | ............. | F04C 18/02 |
| JP | 2008-106940 | 5/2008 | ............... | F16J 15/34 |
| JP | 2011-74931 | 4/2011 | ............... | F16J 15/34 |
| JP | 2011-185292 | 9/2011 | ............... | F16J 15/34 |
| JP | 2012-2295 | 1/2012 | ............... | F16J 15/34 |
| JP | 2012-062534 | 3/2012 | | |
| JP | 2012-82794 | 4/2012 | ............. | F04C 18/02 |
| JP | 2012-122135 | 6/2012 | ............. | C25D 15/02 |
| JP | 2013-167216 | 8/2013 | ............. | F04C 18/02 |
| JP | 2013-213545 | 10/2013 | ............. | F16C 32/06 |
| JP | 2014-529052 | 10/2014 | | |
| JP | 2015-063647 | 4/2015 | | |
| JP | 2015-68330 | 4/2015 | ............. | F04C 29/00 |
| JP | 5693599 | 4/2015 | | |
| JP | 2015-183631 | 10/2015 | ............... | F04C 2/10 |
| JP | 2016-61208 | 4/2016 | ............. | F04C 18/02 |
| JP | 2016-80090 | 5/2016 | ............... | F16J 15/34 |
| JP | 5960145 | 7/2016 | ............... | F16J 15/34 |
| JP | WO2019049847 | 3/2019 | ............... | F16J 15/34 |
| JP | WO2020110922 | 6/2020 | ............... | F16J 15/34 |
| NL | 2022585 B1 | * 8/2020 | ............. | F16J 15/164 |
| WO | WO2006051702 | 5/2006 | ............... | F16J 15/34 |
| WO | WO2011115073 | 9/2011 | ............... | F16J 15/34 |
| WO | WO2012046749 | 4/2012 | ............... | F16J 15/34 |
| WO | WO2013035503 | 3/2013 | ............... | F16J 15/34 |
| WO | WO2013053411 | 4/2013 | | |
| WO | WO2014061544 | 4/2014 | | |
| WO | WO2014148316 | 9/2014 | ............... | F16J 15/34 |
| WO | WO2014148317 | 9/2014 | ............... | F16J 15/34 |
| WO | WO2014174725 | 10/2014 | ............... | F16J 15/34 |
| WO | WO2015111707 | 7/2015 | ............... | F16J 15/18 |
| WO | WO2016035860 | 3/2016 | ............... | F16J 15/34 |
| WO | WO2016167262 | 10/2016 | ............... | F16J 15/34 |
| WO | WO2016186015 | 11/2016 | ............... | F16J 15/34 |
| WO | WO2016186019 | 11/2016 | ............... | F16J 15/34 |
| WO | WO2016186020 | 11/2016 | ............... | F16J 15/34 |
| WO | WO2016203878 | 12/2016 | ............... | F16J 15/34 |
| WO | WO2017002774 | 1/2017 | ............... | F16J 15/34 |
| WO | WO2017061406 | 4/2017 | ............... | F16J 15/34 |
| WO | WO2018025629 | 2/2018 | ............. | F02B 55/02 |
| WO | WO2018092742 | 5/2018 | ............... | F16J 15/34 |
| WO | WO2018105505 | 6/2018 | ............... | F16J 33/12 |
| WO | WO2018139231 | 8/2018 | ............... | F16J 15/34 |
| WO | WO2020129846 | 6/2020 | ............. | F16C 17/04 |
| WO | WO2020130087 | 6/2020 | ............... | F16J 15/34 |
| WO | WO2021125201 | 6/2021 | ............... | F16J 15/18 |

OTHER PUBLICATIONS

International Preliminary Report on Patentability issued in PCT/JP2021/024940, dated Jan. 10, 2023, 4 pages.
International Search Report and Written Opinion issued in PCT/JP2021/024941, dated Sep. 14, 2021, with English translation, 13 pages.
International Preliminary Report on Patentability issued in PCT/JP2021/024941, dated Jan. 10, 2023, 5 pages.
International Search Report and Written Opinion issued in PCT/JP2021/024938, dated Aug. 3, 2021, with English translation, 12 pages.
International Preliminary Report on Patentability issued in PCT/JP2021/024938, dated Jan. 10, 2023, 4 pages.
International Search Report and Written Opinion issued in PCT/JP2021/024945, dated Sep. 7, 2021, with English translation, 16 pages.
International Preliminary Report on Patentability issued in PCT/JP2021/024945, dated Jan. 10, 2023, 6 pages.

(56) References Cited

OTHER PUBLICATIONS

International Search Report and Written Opinion issued in PCT/JP2021/024943, dated Sep. 7, 2021, with English translation, 13 pages.
International Preliminary Report on Patentability issued in PCT/JP2021/024943, dated Jan. 10, 2023, 5 pages.
International Search Report and Written Opinion issued in PCT/JP2021/024944, dated Jul. 27, 2021, with English translation, 11 pages.
International Preliminary Report on Patentability issued in PCT/JP2021/024944, dated Jan. 10, 2023, 4 pages.
Official Action issued in related U.S. Appl. No. 18/012,853, dated Sep. 8, 2023, 11 pages.
Official Action issued in related U.S. Appl. No. 18/012,857, dated Oct. 5, 2023, 11 pages.
Official Action issued in related U.S. Appl. No. 18/012,856, dated Sep. 11, 2023, 8 pages.
Notice of Allowance issued in related U.S. Appl. No. 18/013,515, dated Dec. 19, 2023, 10 pages.
Official Action issued in related U.S. Appl. No. 18/012,856, dated Feb. 2, 2024, 9 pages.
Official Action issued in related U.S. Appl. No. 18/013,513, dated Feb. 15, 2024, 9 pages.
Official Action issued in related U.S. Appl. No. 18/012,857, dated Mar. 21, 2024, 13 pages.
Japanese Official Action issued in related application serial No. 2022-535275, dated Feb. 13, 2024, 8 pages.
Chinese Official Action issued in related Chinese Patent Application Serial No. 202180044553.5, dated Apr. 28, 2024, 13 pages with translation.
European Search Report issued in European Patent Application Serial No. 21837223.3, dated Jun. 25, 2024, 7 pages.
European Search Report issued in European Patent Application Serial No. 21837221.7, dated Jul. 2, 2024, 7 pages.
European Search Report issued in European Patent Application Serial No. 21836928.8, dated Jun. 25, 2024, 8 pages.
European Search Report issued in European Patent Application Serial No. 21837222.5, dated Jul. 12, 2024, 7 pages.
Korean Official Action issued in related Korean Patent Application Serial No. 10-2023-7000902, dated Jul. 26, 2024, 9 pages with translation.
Korean Official Action issued in related Korean Patent Application Serial No. 10-2023-7000900, dated Jul. 26, 2024, 8 pages with translation.

* cited by examiner

SLIDING COMPONENT

TECHNICAL FIELD

The present invention relates to a sliding component used in a rotating machine including an eccentric mechanism.

BACKGROUND ART

Machines entailing rotational driving and used in various industrial fields include not only a rotating machine rotating with its central axis held at a fixed position but also a rotating machine rotating with its central axis entailing eccentricity. The rotating machine rotating with eccentricity is, for example, a scroll compressor. This type of compressor is provided with, for example, a scroll compression mechanism including a fixed scroll having a spiral lap on the surface of an end plate and a movable scroll having a spiral lap on the surface of an end plate and an eccentric mechanism eccentrically rotating a rotary shaft. By the rotary shaft rotating, the movable scroll is slid relative to the fixed scroll with eccentric rotation. As a result, in this mechanism, the fluid supplied from the low-pressure chamber on the outer diameter side of the two scrolls is pressurized and a high-pressure fluid is discharged from the discharge hole formed in the middle of the fixed scroll.

These scroll compressors using the mechanism in which the movable scroll is slid relative to the fixed scroll with eccentric rotation are widely used in, for example, refrigeration cycles because the compressors are highly efficient in terms of compression and cause little noise. However, the compressors are problematic in that a refrigerant leaks from the axial gap between the two scrolls. The scroll compressor described in Patent Citation 1 includes a thrust plate sliding relative to a movable scroll on the back surface side of the movable scroll. A part of a refrigerant compressed by a scroll compression mechanism is supplied to the back pressure chamber formed on the back surface side of the thrust plate, and the movable scroll is pressed toward a fixed scroll. As a result, it is possible to reduce the leakage of the refrigerant from the axial gap between the two scrolls when the refrigerant is compressed.

CITATION LIST

Patent Literature

Patent Citation 1: JP 2016-61208 A (Pages 5 to 6, FIG. 1)

SUMMARY OF INVENTION

Technical Problem

In the scroll compressor described in Patent Citation 1, a part of the refrigerant compressed by the scroll compression mechanism is used to press the movable scroll from the back surface side toward the fixed scroll via the thrust plate. Accordingly, although the refrigerant leakage from the inter-scroll axial gap can be reduced, a pressing force acts from both axial sides between the two scrolls, especially on the sliding surface that entails the eccentric rotation between the movable scroll and the thrust plate. As a result, there is a problem that an increase in frictional resistance occurs, a smooth operation of the movable scroll is hindered, and the efficiency of compression cannot be enhanced.

The present invention has been made in view of such a problem, and an object of the present invention is to provide a sliding component capable of stably reducing the frictional resistance between sliding surfaces entailing eccentric rotation.

Solution to Problem

In order to solve the above problem, a sliding component according to the present invention is a sliding component having a sliding surface relatively sliding with eccentric rotation, wherein the sliding surface is provided with a dynamic pressure generation groove defined by side walls extending in a circumferential direction, at least one of the side walls being formed in a waveshape with amplitude in a radial direction. According to the aforesaid feature of the present invention, the side wall of the dynamic pressure generation groove extends in the circumferential direction in a waveshape having an amplitude in the radial direction. Accordingly, it is possible to ensure a plurality of intersection surfaces generating dynamic pressure regardless of the eccentric rotation angle. As a result, the sliding surface can be separated from another sliding surface in a state where the inclination thereof is reduced, and the frictional resistance between the sliding surfaces can be stably reduced.

It may be preferable that both the side walls of the dynamic pressure generation groove are formed in the waveshape with the amplitude in the radial direction. According to this preferable configuration, when the sliding surface relatively slides with eccentric rotation, dynamic pressure can be generated at a plurality of points in the circumferential direction on both the side wall on the inner diameter side and the side wall on the outer diameter side. Accordingly, the sliding surface is separated in a state where the inclination thereof is reduced.

It may be preferable that the dynamic pressure generation groove is formed in an annular shape. According to this preferable configuration, dynamic pressure can be generated over the entire circumference of the sliding surface.

It may be preferable that the waveshape of the side wall is periodically formed with a constant pitch. According to this preferable configuration, dynamic pressure can be equally generated over the circumferential direction of the sliding surface.

It may be preferable that the waveshape of the side wall is formed by curved surfaces. According to this preferable configuration, the movement of the fluid that moves in the dynamic pressure generation groove becomes smooth and dynamic pressure can be stably generated.

BRIEF DESCRIPTION OF DRAWINGS

FIG. 4 is a diagram illustrating relative sliding between the sliding surface of the side seal and a sliding surface of a thrust plate in the first embodiment of the present invention. It should be noted that FIG. 4A illustrates the start position of the relative sliding

DESCRIPTION OF EMBODIMENTS

Modes for implementing the sliding component according to the present invention will be described below based on embodiments.

First Embodiment

The sliding component according to a first embodiment of the present invention will be described with reference to FIGS. 1 to 5. It should be noted that in the drawings, the groove formed in the sliding surface of the sliding component or the like is dotted for convenience of description.

The sliding component according to the first embodiment of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

Figure 1:
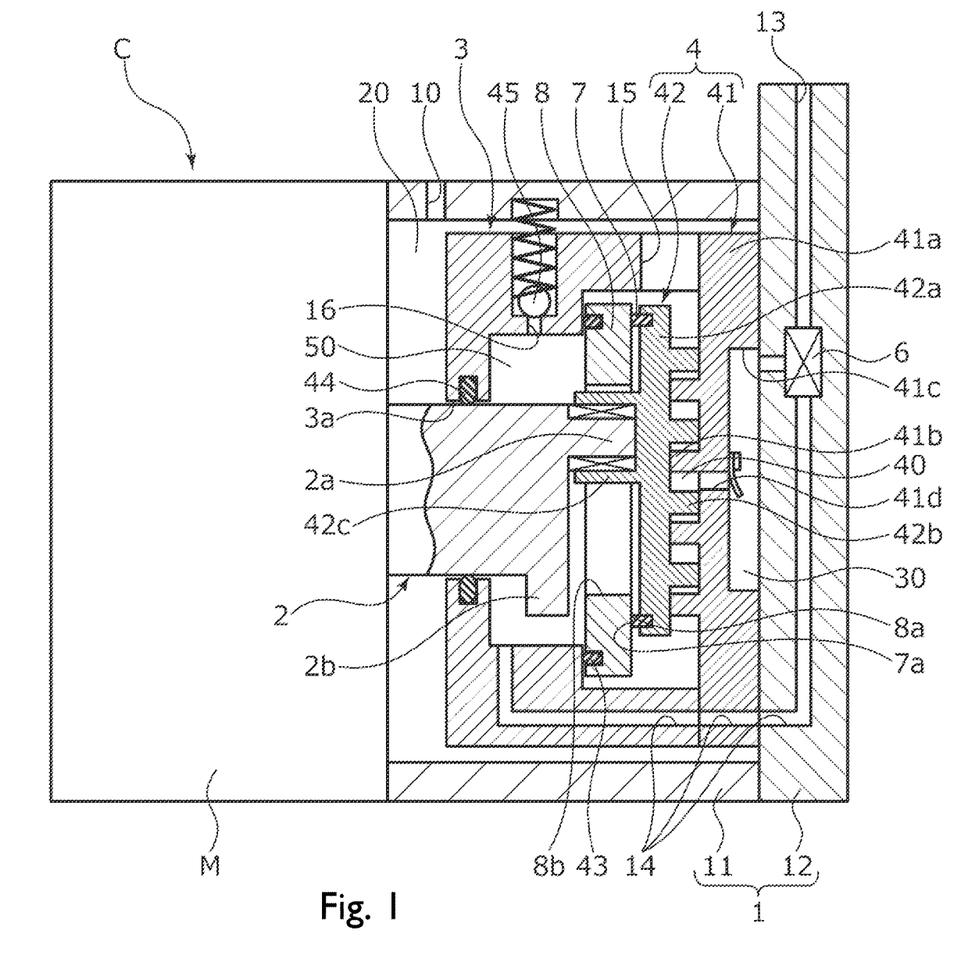
FIG. 1 is a schematic configuration diagram illustrating a scroll compressor to which a side seal as a sliding component according to a first embodiment of the present invention is applied.

First, the scroll compressor C will be described. As illustrated in FIG. 1, the scroll compressor C mainly includes a housing 1, a rotary shaft 2, an inner casing 3, a scroll compression mechanism 4, a side seal 7 as a sliding component, a thrust plate 8, and a drive motor M.

The housing 1 includes a cylindrical casing 11 and a cover 12 blocking an opening of the casing 11. The drive motor M blocks the opening in the casing 11 that is on the side axially opposite to the opening in the casing 11 that is blocked by the cover 12.

Formed in the casing 11 are a low-pressure chamber 20, a high-pressure chamber 30, and a back pressure chamber 50. A low-pressure refrigerant is supplied from a refrigerant circuit (not illustrated) to the low-pressure chamber 20 as the external space on the low-pressure side through a suction port 10. A high-pressure refrigerant compressed by the scroll compression mechanism 4 is discharged to the high-pressure chamber 30. A part of the refrigerant compressed by the scroll compression mechanism 4 is supplied, together with lubricating oil, to the back pressure chamber 50 as the external space on the high-pressure side. It should be noted that the back pressure chamber 50 is formed in the cylindrical inner casing 3 accommodated in the casing 11.

A discharge communication passage 13 is formed in the cover 12. The discharge communication passage 13 allows the refrigerant circuit (not illustrated) and the high-pressure chamber 30 to communicate with each other. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with an axial end portion of the inner casing 3 abutting against an end plate 41a of a fixed scroll 41 constituting the scroll compression mechanism 4. In addition, the inner casing 3 has a side wall where a suction communication passage 15 penetrating the wall in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 and a movable scroll 42. The fixed scroll 41 is fixed to the cover 12 in a sealed shape. The movable scroll 42 is accommodated in the inner casing 3.

The fixed scroll 41 is made of metal and includes a spiral lap 41b. The spiral lap 41b projects toward the movable scroll 42 from the surface of the disk-shaped end plate 41a, that is, the end plate 41a. In addition, the fixed scroll 41 has a recessed portion 41c where the inner diameter side of the back surface of the end plate 41a, that is, the end surface of the end plate 41a that abuts against the cover 12 is recessed in the direction opposite to the cover 12. The high-pressure chamber 30 is defined from the recessed portion 41c and the cover 12.

The movable scroll 42 is made of metal and includes a spiral lap 42b. The spiral lap 42b projects toward the fixed scroll 41 from the surface of a disk-shaped end plate 42a, that is, the end plate 42a. In addition, a boss 42c protruding from the middle of the back surface of the end plate 42a is formed on the movable scroll 42. An eccentric portion 2a formed on the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from the rotary shaft 2 in the present embodiment.

When the rotary shaft 2 is rotationally driven by the drive motor M, the eccentric portion 2a rotates eccentrically and the movable scroll 42 slides, in a posture-maintained state, relative to the fixed scroll 41 with the eccentric rotation. At this time, the movable scroll 42 rotates eccentrically with respect to the fixed scroll 41 and, with this rotation, the contact positions of the laps 41b and 42b sequentially move in the rotation direction and a compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Figure 2:
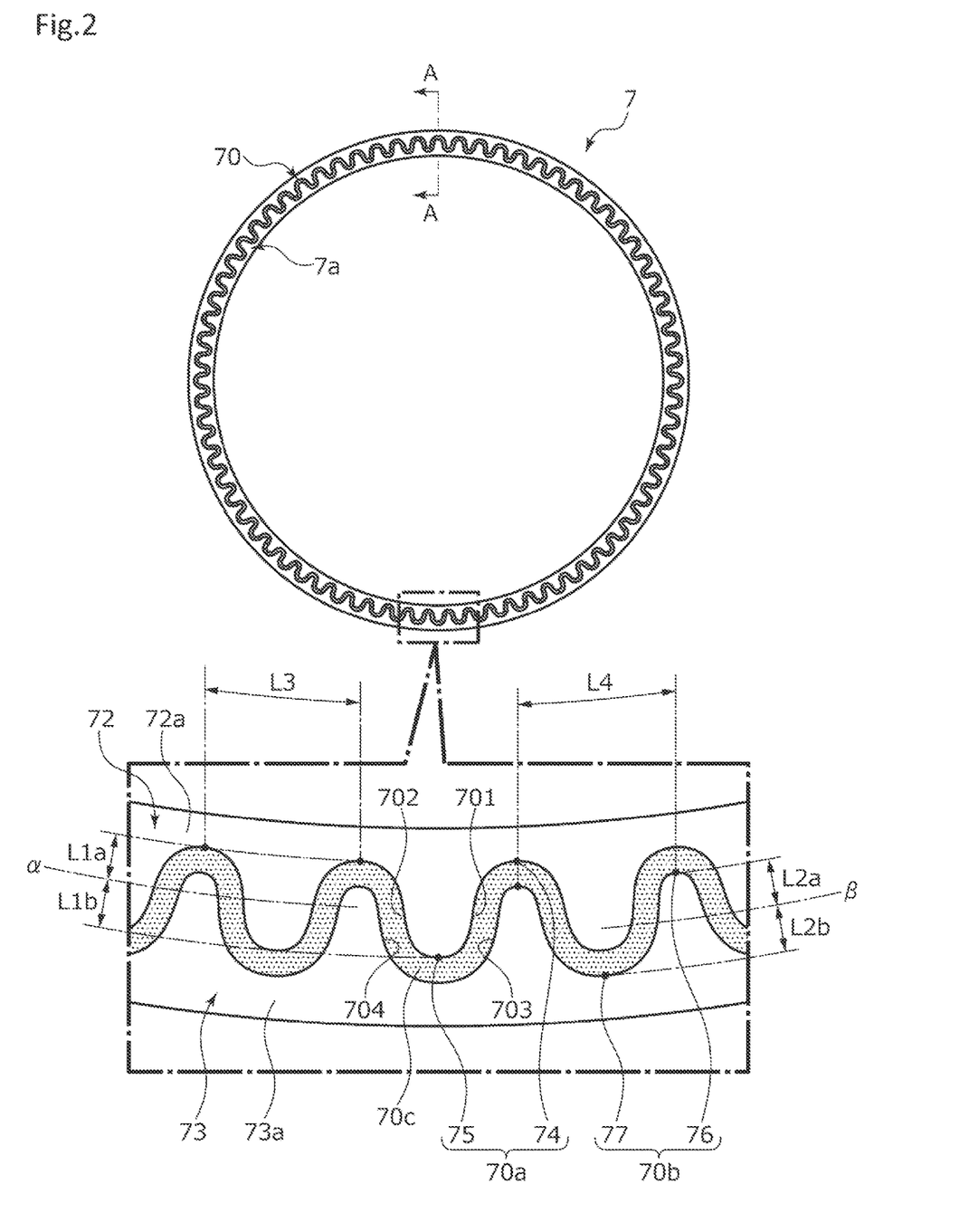
FIG. 2 is a diagram illustrating a sliding surface of the side seal in the first embodiment of the present invention.
Figure 3:
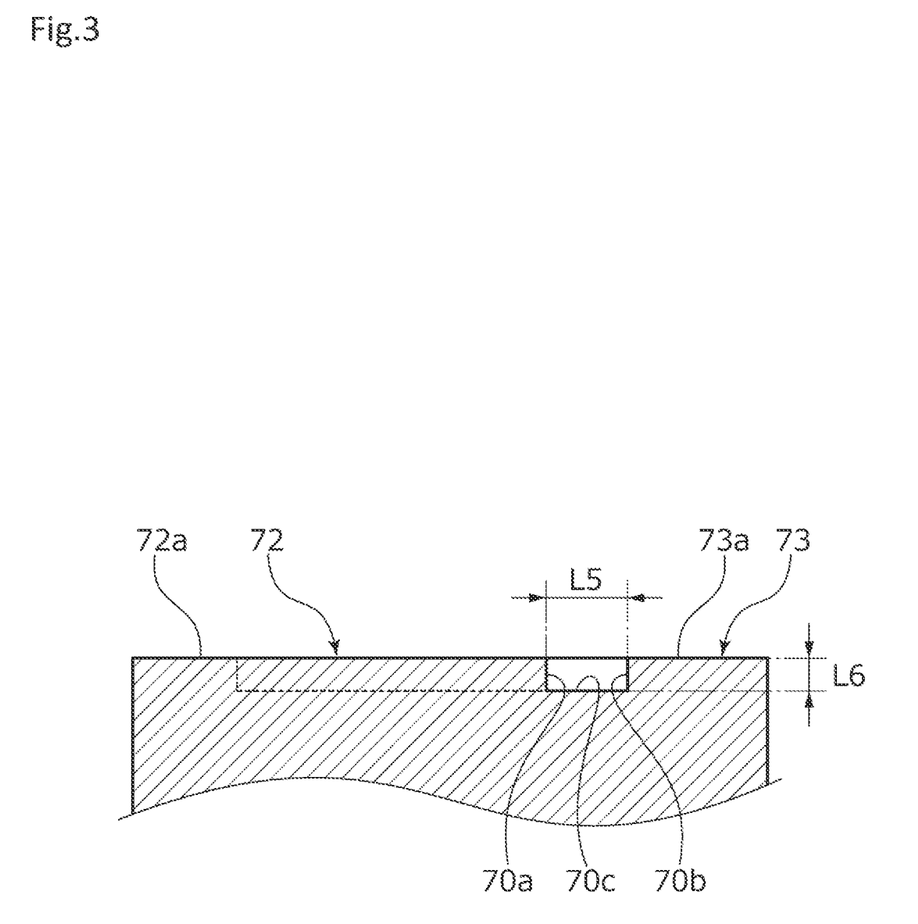
FIG. 3 is an A-A cross-sectional view.

Next, the side seal 7 as a sliding component in the present embodiment will be described. As illustrated in FIGS. 2 and 3, the side seal 7 is made of resin and has a rectangular cross section and an annular shape in an axial view. In addition, the side seal 7 is fixed to the back surface of the end plate 42a of the movable scroll 42 (see FIG. 1). It should be noted that a sliding surface 7a of the side seal 7 is illustrated in FIG. 2.

The side seal 7 has the sliding surface 7a abutting against a sliding surface 8a (see FIG. 1) of the thrust plate 8.

As illustrated in FIG. 2, the sliding surface 7a of the side seal 7 includes a dynamic pressure generation groove 70 formed in an endless ring shape along the sliding surface 7a.

As illustrated in FIGS. 2 and 3, the dynamic pressure generation groove 70 is partitioned by an inner side wall 70a, an outer side wall 70b, and a bottom surface 70c. The inner side wall 70a is formed as a side wall on the inner diameter side extending in the depth direction orthogonal to a flat surface 72a of a land 72 on the inner diameter side. The outer side wall 70b is formed as a side wall on the outer diameter side extending in the depth direction orthogonal to a flat surface 73a of a land 73 on the outer diameter side. The bottom surface 70c extends parallel to the surfaces 72a and 73a formed on the same surface and is formed by connecting the end portions of the inner side wall 70a and the outer side wall 70b.

The inner side wall 70a and the outer side wall 70b have a waveshape extending in the circumferential direction and having an amplitude in the radial direction when viewed from the axial direction. The inner side wall 70a and the outer side wall 70b have a waveshape with a constant period and a constant amplitude.

It should be noted that in the present embodiment below, the radial apexes in the amplitude of the inner side wall 70a are referred to as an inner diameter side apex 74 and an outer diameter side apex 75, and the radial apexes in the amplitude of the outer side wall 70b are referred to as an inner diameter side apex 76 and an outer diameter side apex 77.

Further, it should be noted that the part extending in an S shape from the inner diameter side apex 74 of the inner side wall 70a toward the outer diameter side apex 75 adjacent to the outer diameter side in the clockwise direction with respect to the middle of the side seal 7 is referred to as an intersection surface 701. In addition, the part extending in an inverted S shape from the inner diameter side apex 74 toward the outer diameter side apex 75 adjacent to the outer diameter side in the counterclockwise direction with respect to the middle of the side seal 7 is referred to as an intersection surface 702. In addition, the part extending in an S shape from the inner diameter side apex 76 of the outer side wall 70b toward the outer diameter side apex 77 adjacent to the outer diameter side in the clockwise direction with respect to the middle of the side seal 7 is referred to as an intersection surface 703. In addition, the part extending in an inverted S shape from the inner diameter side apex 76 toward the outer diameter side apex 77 adjacent to the outer diameter side in the counterclockwise direction with respect to the middle of the side seal 7 is referred to as an intersection surface 704.

Specifically, as illustrated in FIG. 2, the inner diameter side apexes 74, the outer diameter side apexes 75, the inner diameter side apexes 76, and the outer diameter side apexes 77 each are equally arranged in the circumferential direction. As for the inner diameter side apex 74 and the outer diameter side apex 75 adjacent to each other on the inner side wall 70a, a maximum amplitude L1a on the inner diameter side and a maximum amplitude L1b on the outer diameter side are equal with respect to a virtual reference line a extending on the circumference, and these maximum amplitudes L1a and L1b are equal over the circumferential direction.

Further, as for the inner diameter side apex 76 and the outer diameter side apex 77 adjacent to each other on the outer side wall 70b, a maximum amplitude L2a on the inner diameter side and a maximum amplitude L2b on the outer diameter side are equal with respect to a virtual reference line β extending on the circumference, and these maximum amplitudes L2a and L2b are equal over the circumferential direction. It should be noted that the maximum amplitudes L1a and L1b and the maximum amplitudes L2a and L2b have the same length (i.e., L1a, L1b=L2a, L2b).

In addition, a circumferential distance L3 (that is, wavelength) between the inner diameter side apexes 74 adjacent on the inner side wall 70a is constant over the circumferential direction, and a circumferential distance L4 (that is, wavelength) between the inner diameter side apexes 76 adjacent on the outer side wall 70b is constant over the circumferential direction.

In addition, the distance L3 is substantially equal to the distance L4. Strictly speaking, the distance L4 is slightly longer than the distance L3 in terms of length (L3≒L4). It should be noted that although not illustrated, the circumferential distance between the outer diameter side apexes 75 is the same length as the distance L3 and the circumferential distance between the outer diameter side apexes 77 is the same length as the distance L4.

In addition, the inner side wall 70a and the outer side wall 70b have a waveshape having a curved surface shape. Specifically, the part near the inner diameter side apex 74 and the inner diameter side apex 76 is a curved surface convex to the inner diameter side, and the part near the outer diameter side apex 75 and the outer diameter side apex 77 is a curved surface convex to the outer diameter side.

As illustrated in FIG. 3, a radial width dimension L5 of the dynamic pressure generation groove 70 (that is, the separation width between the inner side wall 70a and the outer side wall 70b) is constant over the circumferential direction and formed larger than a depth dimension L6 of the dynamic pressure generation groove 70 (i.e., L5>L6). The radial width dimension L5 is constant over the entire circumference of the dynamic pressure generation groove 70. It should be noted that the width dimension L5 is preferably 10 times or more the depth dimension L6 although the width dimension and the depth dimension of the dynamic pressure generation groove 70 can be freely changed on condition that the width dimension of the dynamic pressure generation groove 70 is formed larger than the depth dimension of the dynamic pressure generation groove 70. It should be noted that for convenience of description, the depth dimension L6 of the dynamic pressure generation groove 70 illustrated in FIG. 3 is deeper than the actual depth dimension L6.

Referring to FIG. 1, the thrust plate 8 is made of metal and has an annular shape. In addition, a seal ring 43 is fixed to the thrust plate 8. The seal ring 43 abuts against the inside surface of the inner casing 3. As a result, the thrust plate 8 functions as a thrust bearing that receives an axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is a closed space formed between the inner casing 3 and the rotary shaft 2. A seal ring 44 is fixed to the inner periphery of a through hole 3a provided in the middle of the other end of the inner casing 3 and is in sliding contact in a sealed shape with the rotary shaft 2 inserted through the through hole 3a. In addition, the back pressure communication passage 14 allowing the high-pressure chamber 30 and the back pressure chamber 50 to communicate with each other is formed over the cover 12, the fixed scroll 41, and the inner casing 3. In addition, the back pressure communication passage 14 is provided with an orifice (not illustrated) and, after depressurization adjustment by means of the orifice, the refrigerant in the high-pressure chamber 30 is supplied to the back pressure chamber 50 together with the lubricating oil separated by the oil separator 6. At this time, the pressure in the back pressure chamber 50 is adjusted to be higher than the pressure in the low-pressure chamber 20. It should be noted that a pressure release hole 16 is formed in the inner casing 3, penetrates the inner casing 3 in the radial direction, and allows the low-pressure chamber 20 and the back pressure chamber 50 to communicate with each other. In addition, a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b is formed to have a diameter size at which it is possible to allow eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentric rotation by the eccentric rotation of the rotary shaft 2 (see FIG. 4).

Figure 4A:
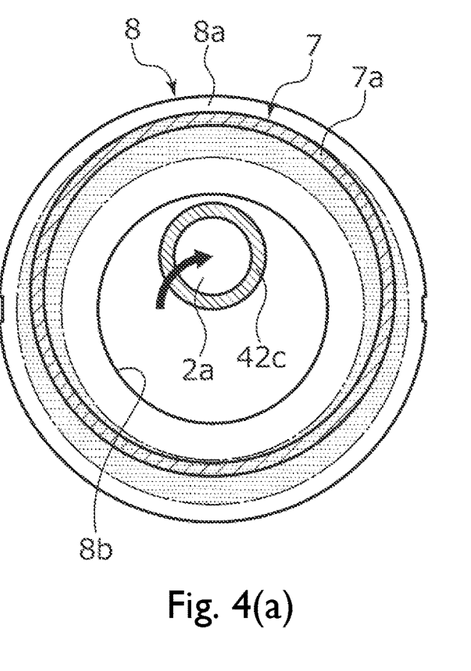
Figure 4B:
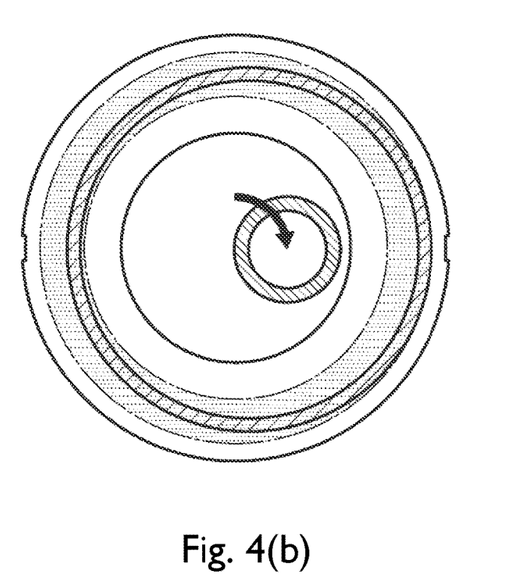
FIGS. 4B to 4D illustrate the positional relationships between the relatively sliding surfaces of the side seal and the thrust plate at an eccentric rotary shaft rotation of 90, 180, and 270 degrees, respectively.
Figure 4C:
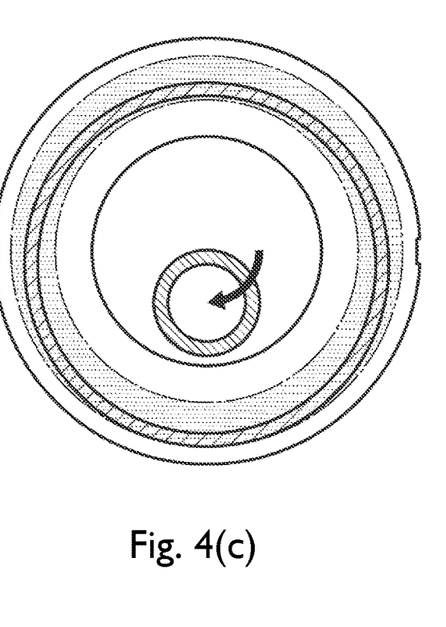
Figure 4D:
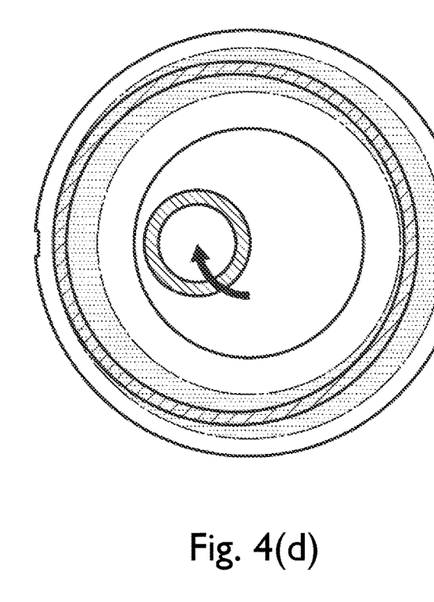

It should be noted that FIGS. 4A to 4D in FIG. 4 illustrate the rotational trajectory of the boss 42c that is viewed from the fixed scroll 41 side and indicated by the black arrows. Respectively illustrated in FIGS. 4B to 4D are the boss 42c rotated by 90 degrees, 180 degrees, and 270 degrees with FIG. 4A serving as the clockwise reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the side seal 7 is a sliding component having the sliding surface 7a sliding relative to the sliding surface 8a of the thrust plate 8 with the eccentric rotation.

Figure 5:
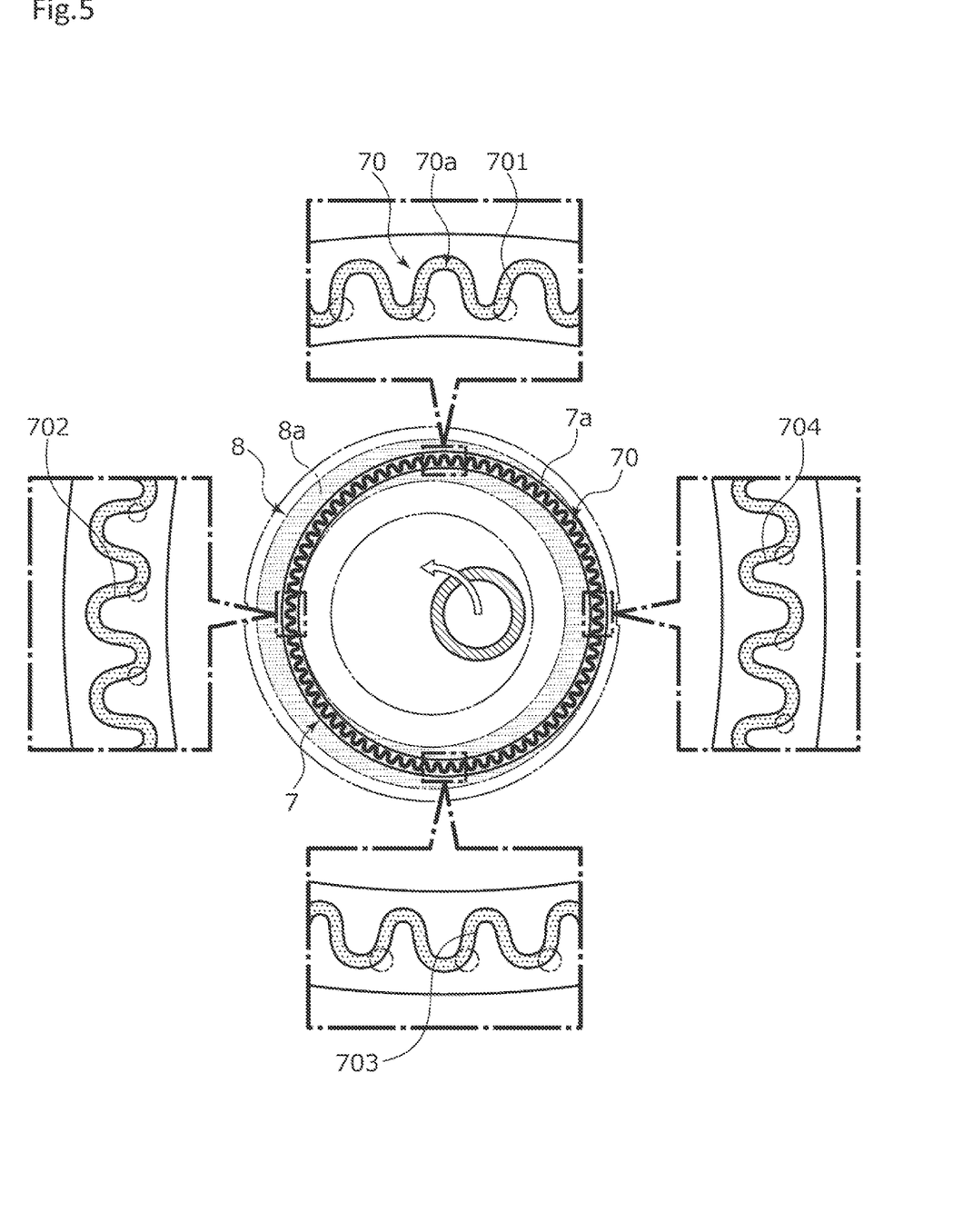
FIG. 5 is a diagram illustrating where the dynamic pressure generated in a dynamic pressure generation groove is generated on the sliding surface of the side seal eccentrically rotating from the state of FIG. 4A toward the state of FIG. 4B.

Next, dynamic pressure generation during the sliding of the side seal 7 relative to the thrust plate 8 will be described with reference to FIG. 5. It should be noted that FIG. 5 illustrates an aspect when the side seal 7 moves from the state of FIG. 4D toward the state of FIG. 4A. In addition, in FIG. 5, the side seal 7 in a case where the sliding surface 7a is viewed from the axial direction is illustrated, and the circle marks illustrated in the enlarged portions indicate the points where the pressure increases in the dynamic pressure generation groove 70. In addition, a fluid containing, for example, a refrigerant and lubricating oil is stored in the dynamic pressure generation groove 70 even when the rotation is stopped.

As illustrated in FIG. 5, when the side seal 7 is to move in the direction of the white arrow, the fluid in the dynamic pressure generation groove 70 moves in the opposite direction relative to the white arrow. As a result, dynamic pressure is generated on the inner side wall 70a and the outer side wall 70b partitioning the dynamic pressure generation groove 70, the sliding surfaces 7a and 8a are slightly separated from each other, and a fluid film is formed by the fluid.

Specifically, when the thrust plate 8 is regarded as an analog clock, the position directly above the paper surface is set to the 12 o'clock position and, at the 12 o'clock position in the dynamic pressure generation groove 70, dynamic pressure is mainly generated on each intersection surface 701 on the inner side wall 70a. In addition, at the 3 o'clock position in the dynamic pressure generation groove 70, dynamic pressure is mainly generated on each intersection surface 704 on the outer side wall 70b. In addition, at the 6 o'clock position in the dynamic pressure generation groove 70, dynamic pressure is mainly generated on each intersection surface 703 on the outer side wall 70b. In addition, at the 9 o'clock position in the dynamic pressure generation groove 70, dynamic pressure is mainly generated on each intersection surface 702 on the inner side wall 70a.

As described above, the inner side wall 70a and the outer side wall 70b of the dynamic pressure generation groove 70 extend in the circumferential direction in a waveshape and have the plurality of intersection surfaces 701 to 704 intersecting with respect to the eccentric rotation of the side seal 7. Accordingly, dynamic pressure can be generated by the intersection surfaces 701 to 704 regardless of the eccentric rotation angle of the side seal 7, the sliding surfaces 7a and 8a can be separated from each other with the inclination of the sliding surfaces 7a and 8a reduced, and the frictional resistance of the sliding surfaces 7a and 8a can be stably reduced.

In addition, at the 12 o'clock and 6 o'clock positions in the dynamic pressure generation groove 70, the intersection surfaces 701 and 703 have a concave shape holding the fluid in the dynamic pressure generation groove 70 that moves toward the opposite direction relative to the white arrow. Accordingly, the fluid near the intersection surfaces 701 and 703 is unlikely to be dispersed in the circumferential direction, and dynamic pressure is generated with ease. In other words, a larger dynamic pressure is generated at the 12 o'clock and 6 o'clock positions in the dynamic pressure generation groove 70 than at the 3 o'clock and 9 o'clock positions in the dynamic pressure generation groove 70.

It should be noted that FIG. 5 illustrates a form when the side seal 7 moves from the state of FIG. 4D toward the state of FIG. 4A, dynamic pressure is generated in substantially the same form when the side seal 7 moves from the state of FIG. 4D toward the state of FIG. 4A, when the side seal 7 moves from the state of FIG. 4A toward the state of FIG. 4B, when the side seal 7 moves from the state of FIG. 4B toward the state of FIG. 4C, and when the side seal 7 moves from the state of FIG. 4C toward the state of FIG. 4D, and thus description is omitted as to the forms when the side seal 7 moves from the state of FIG. 4A toward the state of FIG. 4B, from the state of FIG. 4B toward the state of FIG. 4C, and from the state of FIG. 4C toward the state of FIG. 4D.

In addition, in the sliding of the side seal 7 relative to the thrust plate 8 and entailing eccentric rotation, the position where a large dynamic pressure is generated in the dynamic pressure generation groove 70 continuously moves along the circumferential direction of the dynamic pressure generation groove 70 in accordance with the movement direction of the sliding surface 7a of the side seal 7. Accordingly, a state where the relative inclination between the sliding surfaces 7a and 8a is suppressed can be maintained.

In addition, the dynamic pressure generation groove 70 is formed in an annular shape, and thus dynamic pressure can be generated over the entire circumference of the sliding surface 7a and the inclination of the sliding surfaces 7a and 8a can be reduced regardless of the eccentric rotation angle of the side seal 7.

In addition, the inner side wall 70a and the outer side wall 70b have a waveshape with a constant period, and thus dynamic pressure can be equally generated over the circumferential direction of the sliding surface 7a.

In addition, the inner side wall 70a and the outer side wall 70b have a waveshape having a curved surface shape, and thus the movement of the fluid in the dynamic pressure generation groove 70 becomes smooth and dynamic pressure can be stably generated.

In addition, the back pressure chamber 50 extends to the inner diameter side of the sliding surfaces 7a and 8a.

Accordingly, when the sliding surfaces 7a and 8a are separated from each other, the fluid in the back pressure chamber 50 is introduced from the inner diameter side of the sliding surfaces 7a and 8a. In addition, when the scroll compression mechanism 4 is driven, the pressure of the back pressure chamber 50 increases, a high-pressure fluid is introduced between the sliding surfaces 7a and 8a from the back pressure chamber 50, and thus the sliding surfaces 7a and 8a can be further separated from each other by the pressure of the fluid.

In addition, although the present embodiment exemplifies a form in which the radial width dimension L5 (that is, the separation width between the inner side wall 70a and the outer side wall 70b) of the dynamic pressure generation groove 70 is constant over the entire circumference, the present invention is not limited thereto. In an alternative disposition, the radial width dimension of the dynamic pressure generation groove may be different at different positions in the circumferential direction of the dynamic pressure generation groove. For example, the inner side wall and the outer side wall may be formed in waveshapes with different amplitudes.

Second Embodiment

Next, a dynamic pressure generation groove 170 of a side seal 107 as a sliding component according to a second embodiment of the present invention will be described with reference to FIG. 6. It should be noted that the description of configurations identical to those of the first embodiment will be omitted for redundancy avoidance.

Figure 6:
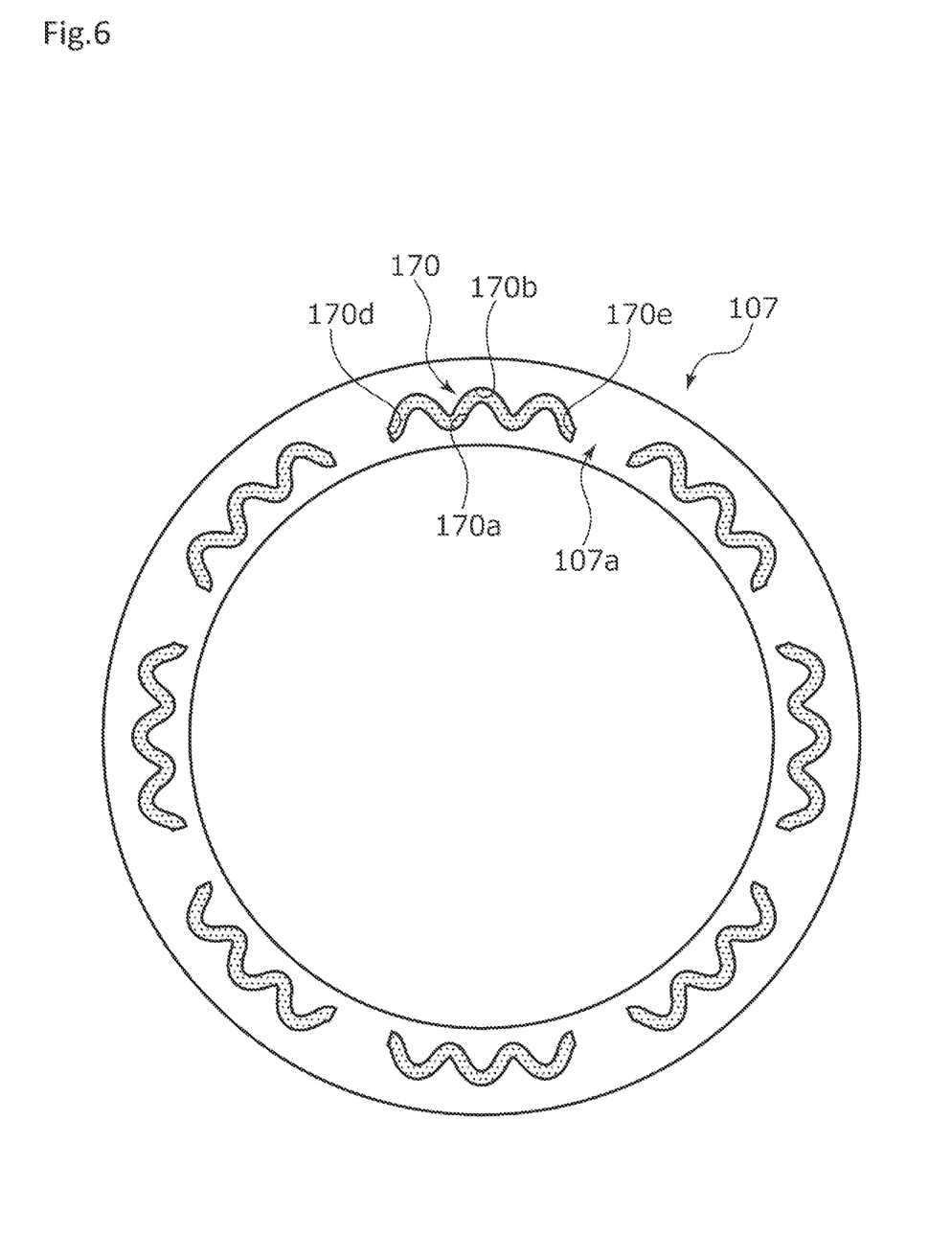
FIG. 6 is a diagram illustrating a sliding surface of a side seal as a sliding component according to a second embodiment of the present invention.

As for the side seal 107 in the second embodiment illustrated in FIG. 6, a plurality of the dynamic pressure generation grooves 170 extending in an arc shape in the circumferential direction are disposed apart from each other in the circumferential direction of a sliding surface 107a.

According to this, dynamic pressure can be generated in both circumferential end portions 170d and 170e of each dynamic pressure generation groove 170 in addition to an inner side wall 170a and an outer side wall 170b of each dynamic pressure generation groove 170. It should be noted that in this case, it is preferable that the dynamic pressure generation grooves 170 are equally arranged in the circumferential direction.

Third Embodiment

Next, a dynamic pressure generation groove 270 of a side seal 207 as a sliding component according to a third embodiment of the present invention will be described with reference to FIG. 7. It should be noted that the description of configurations identical to those of the first embodiment will be omitted for redundancy avoidance.

Figure 7:
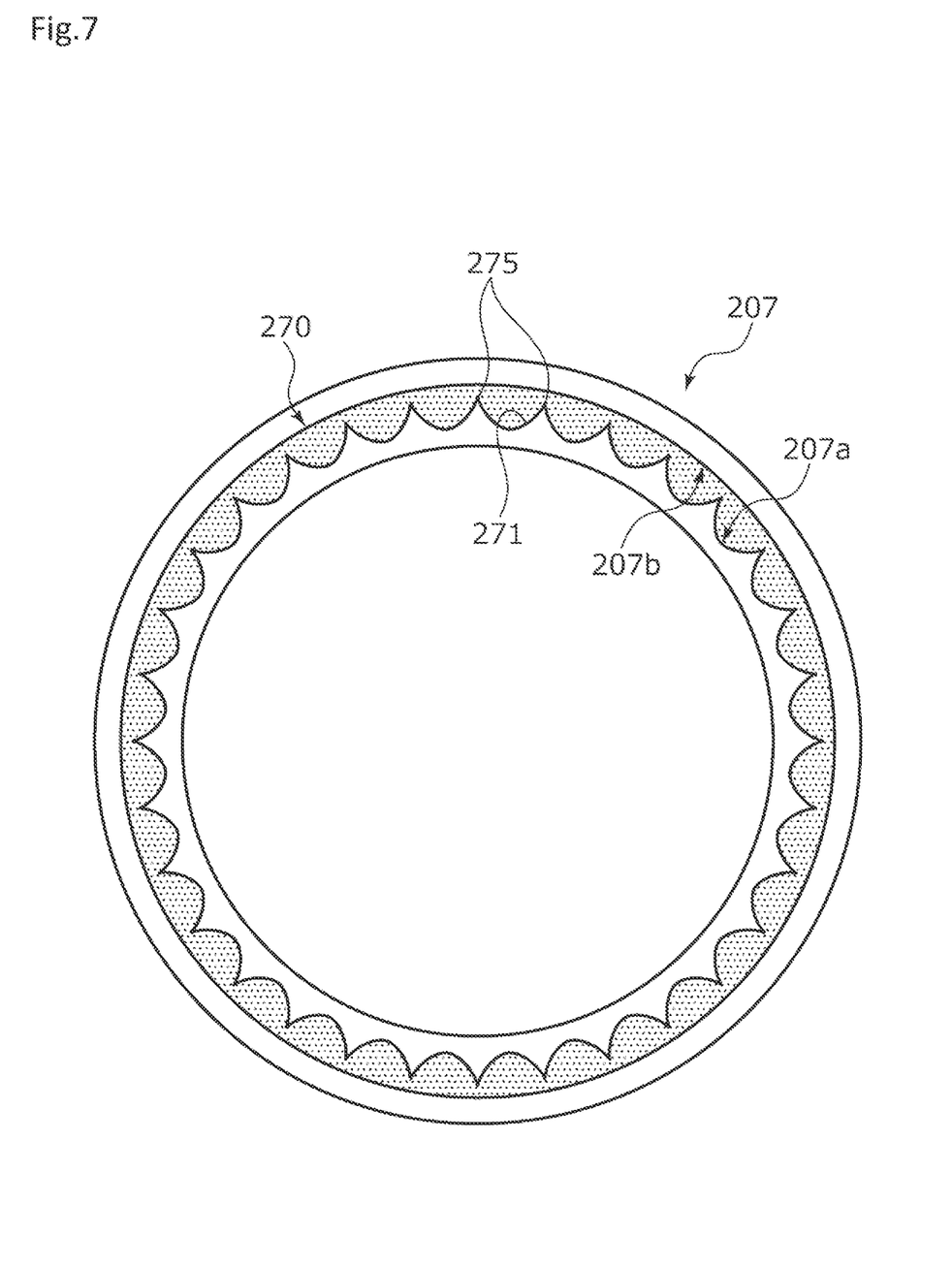
FIG. 7 is a diagram illustrating a sliding surface of a side seal as a sliding component according to a third embodiment of the present invention.

As for the dynamic pressure generation groove 270 of the side seal 207 in the third embodiment illustrated in FIG. 7, an inner side wall 270a is wavy when viewed from the axial direction. In addition, an outer side wall 270b is circular when viewed from the axial direction. In this manner, the dynamic pressure generation groove may be wavy on at least one of the inner and outer side walls.

In addition, the inner side wall 270a has an outer diameter side apex 275 that tapers with an acute angle. In addition, the inner side wall 270a has a waveshape. According to this, the circumferential width of the outer diameter side apex 275 can be reduced, and thus it is possible to ensure a large intersection surface 271 that has a circular arc shape, is convex to the inner diameter side, and is formed between the outer diameter side apexes 275 adjacent to each other.

Although embodiments of the present invention have been described above with reference to the drawings, the specific configurations are not limited to the embodiments and any changes or additions within the scope of the present invention are included in the present invention.

For example, although a form in which the inner and outer side walls have a waveshape having a curved surface shape has been exemplified in the first to third embodiments, the present invention is not limited thereto and the waveshape may be, for example, rectangular or triangular when viewed from the axial direction.

In addition, although an aspect in which the side seal 7 as a sliding component is applied to the scroll compressor C used in the air conditioning system of an automobile or the like has been described in the first to third embodiments, the present invention is not limited thereto and the side seal 7 as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

In addition, insofar as the sliding component of the present invention has a sliding surface that relatively slides with eccentric rotation, the sliding component of the present invention may be used in an environment in which the pressure inside the sliding surface and the pressure outside the sliding surface are equal to each other without being limited to an environment in which there is a pressure difference between the inside and outside of the sliding surface. In addition, the sliding component of the present invention does not have to function as a seal and may be one capable of stably reducing the frictional resistance of a sliding surface.

In addition, although the side seal having the relatively sliding surface is made of resin and the thrust plate is made of metal in the first to third embodiments, the material of the sliding component may be freely selected in accordance with the environment of use and so on.

In addition, although an aspect in which a dynamic pressure generation groove is formed in the sliding surface of the side seal has been described in the first to third embodiments, the present invention is not limited thereto. A dynamic pressure generation groove may be formed in the sliding region of the sliding surface of the thrust plate (see FIG. 4), which is a sliding component having a sliding surface relatively sliding with eccentric rotation. In addition, dynamic pressure generation grooves may be formed in both the sliding surface of the side seal and the sliding surface of the thrust plate.

In addition, although a configuration in which the sliding surface of the side seal and the sliding surface of the thrust plate as a sliding component slide relative to each other with eccentric rotation has been described in the first to third embodiments, the present invention is not limited thereto. A dynamic pressure generation groove may be formed in the sliding surface relatively sliding with eccentric rotation with only one of the side seal and the thrust plate provided. For example, in a case where only the thrust plate is provided, dynamic pressure generation grooves may be formed in one or both of the sliding surface of the thrust plate as a sliding component and the back surface of the end plate of the movable scroll. In addition, in a case where only the side seal is provided, a dynamic pressure generation groove may be formed in the sliding surface of the side seal as a sliding component. In this case, the side seal also functions as a thrust bearing that abuts against the inner peripheral surface of the inner casing and receives the axial load of the movable scroll.

In addition, in a case where the side seal and the thrust plate are not provided and the back surface of the end plate of the movable scroll functions as a thrust bearing that abuts against the inner peripheral surface of the inner casing and receives the axial load of the movable scroll, a dynamic pressure generation groove may be formed in the sliding surface formed on the back surface of the end plate of the movable scroll.

In addition, the sliding surface may be provided with a conduction groove for conduction between the external space on the inner diameter side or the outer diameter side of the sliding surface and the dynamic pressure generation groove.

In addition, although a form in which the external space on the low-pressure side is on the outer diameter side of the side seal and the high-pressure external space is on the inner diameter side of the side seal has been exemplified, the external space on the low-pressure side may be on the inner diameter side of the side seal with the high-pressure external space on the outer diameter side of the side seal.

REFERENCE SIGNS LIST

4 Scroll compression mechanism
7 Side seal (sliding component)
7a Sliding surface
8 Thrust plate
8a Sliding surface
20 Low-pressure chamber (external space on outer diameter side)
30 High-pressure chamber
40 Compression chamber
41 Fixed scroll
42 Movable scroll
50 Back pressure chamber (external space on inner diameter side, external space on high-pressure side)
70 Dynamic pressure generation groove
70a Inner side wall (side wall on inner diameter side)
70b Outer side wall (side wall on outer diameter side)
107 Side seal (sliding component)
107a Sliding surface
170 Dynamic pressure generation groove
170a Inner side wall (side wall on inner diameter side)
170b Outer side wall (side wall on outer diameter side)
207 Side seal (sliding component)
270a Inner side wall (side wall on inner diameter side)
270b Outer side wall (side wall on outer diameter side)
271 Intersection surface
701 to 704 Intersection surface
C Scroll compressor
M Drive motor

The invention claimed is:

1. An eccentric sliding assembly comprising: a first sliding component having a sliding surface; a second sliding component having a sliding surface slidable to the sliding surface of the first sliding component; a rotational member configured to rotate around a predetermined axis; a movable member which is the first sliding component or to which the first sliding component is attached;

and a fixed member which is the second sliding component or to which the second sliding component is attached; wherein the rotational member has an eccentric portion eccentrically formed with respect to the predetermined axis and protruded toward the movable member, the movable member has a boss fitted around the eccentric portion of the rotational member and is relatively rotatable therewith, and the sliding surface of at least one of the first sliding component and the second sliding component is provided with a dynamic pressure generation groove defined by side walls extending in a circumferential direction, at least one of the side walls being formed in a waveshape with amplitude in a radial direction.

2. The eccentric sliding assembly according to claim 1, wherein both the side walls of the dynamic pressure generation groove are formed in the waveshape with the amplitude in the radial direction.

3. The eccentric sliding assembly according to claim 1, wherein the dynamic pressure generation groove is formed in an annular shape.

4. The eccentric sliding assembly according to claim 1, wherein the waveshape of the side wall is periodically formed with a constant pitch.

5. The eccentric sliding assembly according to claim 1, wherein the waveshape of the side wall is formed by curved surfaces.

6. The eccentric sliding assembly according to claim 2, wherein the dynamic pressure generation groove is formed in an annular shape.

7. The eccentric sliding assembly according to claim 2, wherein the waveshape of the side wall is periodically formed with a constant pitch.

8. The eccentric sliding assembly according to claim 2, wherein the waveshape of the side wall is formed by curved surfaces.

9. The eccentric sliding assembly according to claim 3, wherein the waveshape of the side wall is periodically formed with a constant pitch.

10. The eccentric sliding assembly according to claim 3, wherein the waveshape of the side wall is formed by curved surfaces.

11. The eccentric sliding assembly according to claim 4, wherein the waveshape of the side wall is formed by curved surfaces.

* * * * *